United States Patent
Schertler (10) Patent No.: US 11,954,845 B2
(45) Date of Patent: Apr. 9, 2024

(54) METHOD FOR DETERMINING STRIATION PROPERTIES OF FATIGUE STRIATIONS AND FOR DETERMINING THE PRESENCE OF FATIGUE DAMAGE

(71) Applicant: Airbus (S.A.S.), Blagnac (FR)

(72) Inventor: Klaus Schertler, Taufkirchen (DE)

(73) Assignee: Airbus (S.A.S.), Blagnac (FR)

( * ) Notice: Subject to any disclaimer, the term of this patent is extended or adjusted under 35 U.S.C. 154(b) by 112 days.

(21) Appl. No.: 17/330,573

(22) Filed: May 26, 2021

(65) Prior Publication Data
US 2021/0374929 A1  Dec. 2, 2021

(30) Foreign Application Priority Data
May 26, 2020 (EP) .................................... 20315262

(51) Int. Cl.
*G06T 7/00* (2017.01)
*G06T 5/00* (2006.01)
(Continued)

(52) U.S. Cl.
CPC ............... *G06T 7/001* (2013.01); *G06T 5/00* (2013.01); *G06T 5/20* (2013.01); *G06T 5/40* (2013.01);
(Continued)

(58) Field of Classification Search
CPC .. G01N 2021/8887; G06T 2207/10061; G06T 2207/20048; G06T 2207/30136;
(Continued)

(56) References Cited

U.S. PATENT DOCUMENTS

| 9,355,440 | B1 | 5/2016 | Chen et al. |
| 2012/0004849 | A1 | 1/2012 | Aarre |
| 2017/0167949 | A1* | 6/2017 | Xia ...................... G01M 11/083 |

FOREIGN PATENT DOCUMENTS

| CN | 110298835 | * 10/2019 | ........... G06T 7/0004 |
| CN | 111260640 | *  6/2020 | ............. G06T 3/608 |
| DE | 102007008768 | *  8/2008 | ........... G01B 11/303 |

OTHER PUBLICATIONS

European Search Report for Application No. 20315262.4 dated Nov. 9, 2020.
(Continued)

*Primary Examiner* — Zhiyu Lu
(74) *Attorney, Agent, or Firm* — KDW FIRM PLLC (57) ABSTRACT

To improve measurement or assessment of fatigue damage to parts, a computer-implemented method for measuring striation properties of fatigue striations on a sample surface of a part is disclosed. A sample surface is imaged using a scanning electron microscope to obtain a sample image potentially containing the fatigue striations. A sample image patch potentially containing fatigue striations is selected from the sample image. After normalizing the sample image patch and enhancing line-like regular structures contained in the sample image patch, the normalized image patch is autocorrelated, Radon transformed and spectrally analyzed. The resulting power spectrum of the transformed image patch contains information about striation properties of the fatigue striations contained in the sample image, if any fatigue striations are present. Furthermore, a system for performing the method is disclosed.

12 Claims, 7 Drawing Sheets

(51) Int. Cl.
*G06T 5/20* (2006.01)
*G06T 5/40* (2006.01)

(52) U.S. Cl.
CPC .............. *G06T 2207/10061* (2013.01); *G06T 2207/30164* (2013.01)

(58) Field of Classification Search
CPC . G06T 2207/30164; G06T 5/001; G06T 5/20; G06T 5/40; G06T 7/0004; G06T 7/001
See application file for complete search history.

(56) References Cited

OTHER PUBLICATIONS

Otsu, N., "A Threshold Selection Method from Gray-Level Histograms", IEEE Transactions on Systems, Man, and Cybernetics, vol. 9, No. 1, pp. 62-66, (1979).
Zuiderveld, Karel, "Contrast Limited Adaptive Histograph Equalization.", Graphic Gems IV. San Diego: Academic Press Professional, pp. 474-485 (1994).
Bailey, Donald, "Detecting regular patterns using frequency domain self-filtering", vol. 1, pp. 440-443 (1997).
Gonzales et al., "Digital Image Processing", Prentice Hall International, 2007.
Richard G. Lyons, "Understanding Digital Signal Processing", Prentice Hall, 2011.

\* cited by examiner

METHOD FOR DETERMINING STRIATION PROPERTIES OF FATIGUE STRIATIONS AND FOR DETERMINING THE PRESENCE OF FATIGUE DAMAGE

CROSS-REFERENCE TO RELATED APPLICATION

This application claims priority to European Patent Application EP 20315262.4 filed May 26, 2020, the entire disclosure of which is incorporated by reference herein.

TECHNICAL FIELD

The disclosure herein relates to a method for determining striation properties of fatigue striations. The disclosure herein also relates to a method for determining the presence of fatigue damage.

BACKGROUND

Reference is made to the following prior art documents:
[1] R. C. Gonzales, R. E. Woods, "Digital Image Processing", Prentice Hall International, 2007
[2] R. G. Lyons, "Understanding Digital Signal Processing", Prentice Hall, 2011
[3] Zuiderveld, Karel, "Contrast Limited Adaptive Histograph Equalization.", Graphic Gems IV. San Diego: Academic Press Professional, 1994, 474-485
[4] Otsu, N., "A Threshold Selection Method from Gray-Level Histograms", IEEE Transactions on Systems, Man, and Cybernetics, Vol. 9, No. 1, 1979, pp. 62-66
[5] Bailey, Donald, "Detecting regular patterns using frequency domain self-filtering", 440-443 vol. 1, 1997, 10.1109/ICIP.1997.647801

SUMMARY

It is an object of the disclosure herein to improve the measurement or assessment of fatigue damage to parts, such as aircraft parts.

The object is achieved through the features and embodiments disclosed herein.

The disclosure herein provides a computer-implemented method for determining striation properties of fatigue striations on a sample surface of a part, preferably an aircraft part, the method comprising:
 1.1 with a scanning microscope device, imaging the sample surface so as to obtain a sample image potentially containing the fatigue striations;
 1.2 with an image patch selecting device, selecting a sample image patch potentially containing the fatigue striations from the sample image for further processing;
 1.3 with a pre-processing device, normalizing the sample image patch and enhancing line-like regular structures contained in the sample image patch so as to obtain a normalized image patch;
 1.4 with an autocorrelation device, determining the autocorrelation of the normalized image patch so as to obtain an autocorrelation image patch;
 1.5 with a Radon transform device, performing a Radon transform of the autocorrelation image patch so as to obtain a transformed image patch;
 1.6 with a frequency analysis device, performing a spectral analysis of the transformed image patch and determining a power spectrum of the transformed image patch;
 1.7 with a striation property determining device, determining, from the power spectrum, at least one striation property that is suitable to indicate the presence of fatigue striations in the sample image patch.

Preferably, in step 1.1 the scanning microscope device is selected from a group including a scanning electron microscope or a scanning probe microscope.

Preferably, in step 1.2 a plurality of different sized sample image patches is selected, and the sample image patches are centered around the same point of the sample image, and the steps 1.3 to 1.7 are performed on each of the sample image patches.

Preferably, in step 1.3 a Gaussian filter operation is performed on the sample image patch to obtain the normalized image patch.

Preferably, in step 1.3 a histogram equalization is performed on the sample image patch to obtain the normalized image patch.

Preferably, in step 1.3 an image binarization and subsequent morphological operation, such as erosion, dilation or skeleton-operations, are performed on the sample image patch to obtain the normalized image patch.

Preferably, in step 1.3 a frequency domain self-filtering operation is performed on the sample image patch to obtain the normalized image patch.

Preferably, in step 1.3 a window operation, such as applying a Hamming window, is performed on the sample image patch to obtain the normalized image patch.

Preferably, in step 1.3 a normalization operation to normalize intensity values to a fixed range is performed on the sample image patch to obtain the normalized image patch.

Preferably, in step 1.4 the auto correlation is determined via the frequency domain and/or using a zero-padded input image patch.

Preferably, in step 1.6 the spectral analysis is performed by a one-dimensional spectral analysis along each radial coordinate that corresponds to the columns of the transformed image patch.

Preferably, in step 1.7 the striation angle and/or striation distance and/or striation density is determined from the strongest frequency component of the power spectrum.

Preferably, the method further comprises the step of repeating the steps 1.1 to 1.7 along a fracture surface and/or along a crack propagation path.

Preferably, the striation properties are integrated along the fracture surface and/or crack propagation path and determining integrated striation properties and/or errors of the integrated striation properties.

The disclosure herein provides a computer-implemented method for determining whether a part, in particular an aircraft part, suffers from fatigue damage, the method comprising:
 performing the method according to any of the preceding steps; and
 with a fatigue damage determining device, determining, if a peak in the power spectrum exceeds a predetermined threshold, that the part suffers from fatigue damage, and determining, if the peak does not exceed the predetermined threshold, that the part does not suffer from fatigue damage.

The disclosure herein provides a system configured for carrying out a preferred method, the system comprising a scanning microscope device adapted for imaging the sample surface so as to obtain a sample image potentially containing the fatigue striations and a data processing apparatus having:

an image patch selecting device adapted for selecting a sample image patch potentially containing the fatigue striations from the sample image;

a pre-processing device adapted for normalizing the sample image patch and enhancing line-like regular structures contained in the sample image patch so as to obtain a normalized image patch;

an autocorrelation device adapted for determining the autocorrelation of the normalized image patch so as to obtain an autocorrelation image patch;

a Radon transform device adapted for performing a Radon transform of the autocorrelation image patch so as to obtain a transformed image patch;

a frequency analysis device adapted for performing a spectral analysis of the transformed image patch and determining a power spectrum of the transformed image patch;

a striation property determining device adapted for determining, from the power spectrum, at least one striation property that is suitable to indicate the presence of fatigue striations in the sample image.

Preferably, the data processing apparatus further has a fatigue damage determining device adapted for determining at least one striation property of the fatigue striations contained in the sample image.

The disclosure herein provides a computer program product comprising instructions which, when the program is executed by a computer, cause the computer to carry out the method according to any of the preceding steps.

The disclosure herein provides a computer-readable data carrier having stored thereon the preferred computer program product.

The disclosure herein provides a data carrier signal carrying the preferred computer program product.

The disclosure herein is based on the technical field of data science (computer vision, image processing and pattern recognition) as applied to material science, in particular material failure analysis and fracture surface analysis. The idea is to measure fatigue striation properties, which are used in a failure analysis process in analyzing fracture surfaces of material failures produced by fatigue.

In order to determine whether a part suffers from fatigue damage and is prone to material failure, different fatigue striation properties, such as striation number, striation density and striation angle are to be determined. Another basic idea is to process a large number of fracture surface locations that show fatigue striations and their striation properties, such as striation density (the number of striation lines per unit length) are measured. The striation properties are integrated along the crack propagation path of the fracture surface to estimate a total striation count.

A purpose of the methods and devices described herein is to allow a robust estimation or measurement of striation densities and striation orientations that are present in scanning electron microscope images (SEM images). A robust measurement based on computer vision techniques is challenging due to large appearance variations of the striations in the SEM images. Known computer vision techniques based on supervised machine learning are difficult to apply since there is insufficient availability of training data with respect to data quality and amount.

Here, the idea is to provide an unsupervised robust computer vision method for striation density and orientation estimation or measurement as a technical means for partly or fully automated fatigue striation measurement systems.

Initially, at least one SEM image of the part under test is taken. The input to be processed is an image patch, i.e. a subpart of the SEM image, representing the part of the image that should be analyzed. The goal is a robust estimation of the striation density and orientation inside the image patch. This is particularly challenging if the image patch contains only faint striations.

As a first step, the input image patch is normalized and line-like regular structures are enhanced. In order to achieve this, standard image processing techniques may be used, such as:

Gaussian filter operations to reduce image noise (see c.f. [1])

Histogram equalization (see c.f. [3])

Image binarization (see c.f. [4])

Morphological operations on the binarized image-like erosion, dilation of skeleton-operations (see c.f. [1])

Self-filtering (see c.f. [5])

Windowing of the image patch to decrease intensities at the patch edges (see c.f. [1])

Normalizing intensity values to a fixed range, e.g. 0 to 1.

After the pre-processing step, a normalized image representation with enhanced regular structures is obtained. The normalized image is further processed by computing the autocorrelation of the pre-processed image patch, i.e. the correlation of the image patch with itself. The autocorrelation can efficiently be computed in the frequency domain, using a zero-padded image patch as input to avoid wrap-around effects and to increase spatial resolution.

Then, a spectral frequency analysis of the Radon transform of the previous autocorrelation is performed.

The Radon transform of the autocorrelation image produces a transformed image, where the horizontal axis corresponds to the Radon projection angle and the vertical axis correspond to the radial coordinates of the Radon projection.

Each column in the Radon transform thus corresponds to an intensity profile created by an integration (projection) of the intensities of the autocorrelation image on an axis of a given angle.

Usually only a small horizontal range, i.e. angle range, exhibits repetitive structures of the original autocorrelation image. The corresponding angle represents the searched angle of the striations since only the projection along the right angle does not smear out the repetitive structure of the autocorrelation image. This makes the analysis very selective to the correct striation angle.

In order to identify the column with the strongest repetitive structure, standard one-dimensional spectral analysis, e.g. based on the Fourier transformation (FT) or fast Fourier transformation (FFT), is applied on each column of the Radon transformation. This way, the column with the strongest frequency component in the Fourier spectrum (e.g. with the highest value in the power spectrum) can be selected to determine the searched striation angle. Knowing the strongest frequency component also leads to the striation distance (the wavelength of the striations) by taking into account the known relation between frequency and wavelength. The reciprocal value of the striation distance is the searched striation density.

The robustness of this process can further be improved by only taking frequency components into account if they correspond to a meaningful number of striations in the original input patch (e. g. a minimum of 5 striation lines). This way, a strong frequency component in the Fourier spectrum would be ignored (e.g. by setting its magnitude to 0) if it corresponds e. g. to only 2 striation lines inside the input patch.

Applying a one-dimensional FFT on each column of the Radon transform allows for the computation of the power spectrum (the squared magnitude of the Fourier spectrum). Irrelevant frequency components are set to 0 as previously discussed. After the FFT the horizontal axis is still the angle (as in the Radon transform) while the vertical axis is now the spatial frequency. The dominant frequency of the striations and its corresponding angle are usually clearly identifiable by well localized peaks in the power spectrum (e.g. by finding the position of the maximum value of the power spectrum). This allows for robust identification of the striation distance and striation angle.

The maximum value of the power spectrum as determined can further serve as a measure of evidence for the presence of striations in the input patch. This evidence measure can be used to detect areas of striations inside full SEM images by performing the steps previously discussed on different positions inside the SEM image (i.e. cutting out and analyzing many different patches at different image positions). A striation is deemed to be detected at a given image position if its corresponding patch provides an evidence measure above a given threshold.

The size of the input patch (i.e. its patch width and height in number of pixels) influences the quality of the estimation of striation density and orientation. A patch size selected too small may only contain a too small number of striations—thus the measurement of the spatial frequency of striations may get inaccurate. On the other hand, a patch size selected too large may already include areas of the fracture surface not representing striations, which may introduce noise into the density and orientation estimation. The selection of the ideal patch size can be achieved by analyzing a variety of differently sized patches centered at the same point inside the SEM image and subsequently selecting the one with the highest evidence measure (e.g. power spectrum value).

With the methods and devices described herein it is possible to identify or detect fatigue striations inside SEM images and to robustly measure the striation densities and orientations, which allows for a highly automated striation counting system. A large number of SEM images of a fracture surface, e.g. of a long crack propagation path, may be automatically recorded. SEM images containing fatigue striations may be automatically identified and their center positions recorded as well as the ideal patch sizes.

Furthermore, the striation densities and orientations at all recorded striation positions can be measured and recorded automatically.

The recorded measurements, to remove potential measurement outliers, may be automatically filtered based on the estimated striation orientation angles or striation densities that are not consistent with the known physics of crack propagation.

Furthermore, the striation densities may be automatically integrated along the crack propagation path to retrieve and record a final striation count. Statistics on the available large number of measurements (e.g. standard deviations of the measured striation densities per SEM image) can be used to propagate measurement errors into an error estimation for the final striation count.

The results may be presented to a domain expert (e.g. in the form of a graphical user interface) for the validation or potential correction of automatically taken processing steps. All corrections made by the domain expert can be recorded. Corrections may include the removal of wrong automatic measurements or the addition of new measurements at additional relevant positions that can be supported by the automated density and orientation estimation, e.g. at a clicked position inside the SEM image.

Furthermore, reports can be automatically created from the recorded measured data.

The recordings of validations and corrections performed by the domain expert may be used for the training of a machine learning algorithm that may help to avoid manual corrections in the long term (e.g. by using validated automatic measurements as positive training examples and corrected ones as negative training examples).

BRIEF DESCRIPTION OF THE DRAWINGS

Embodiments of the disclosure herein are subsequently described in more detail with reference to the accompanying schematic drawings. Therein.

DETAILED DESCRIPTION

Figure 1:
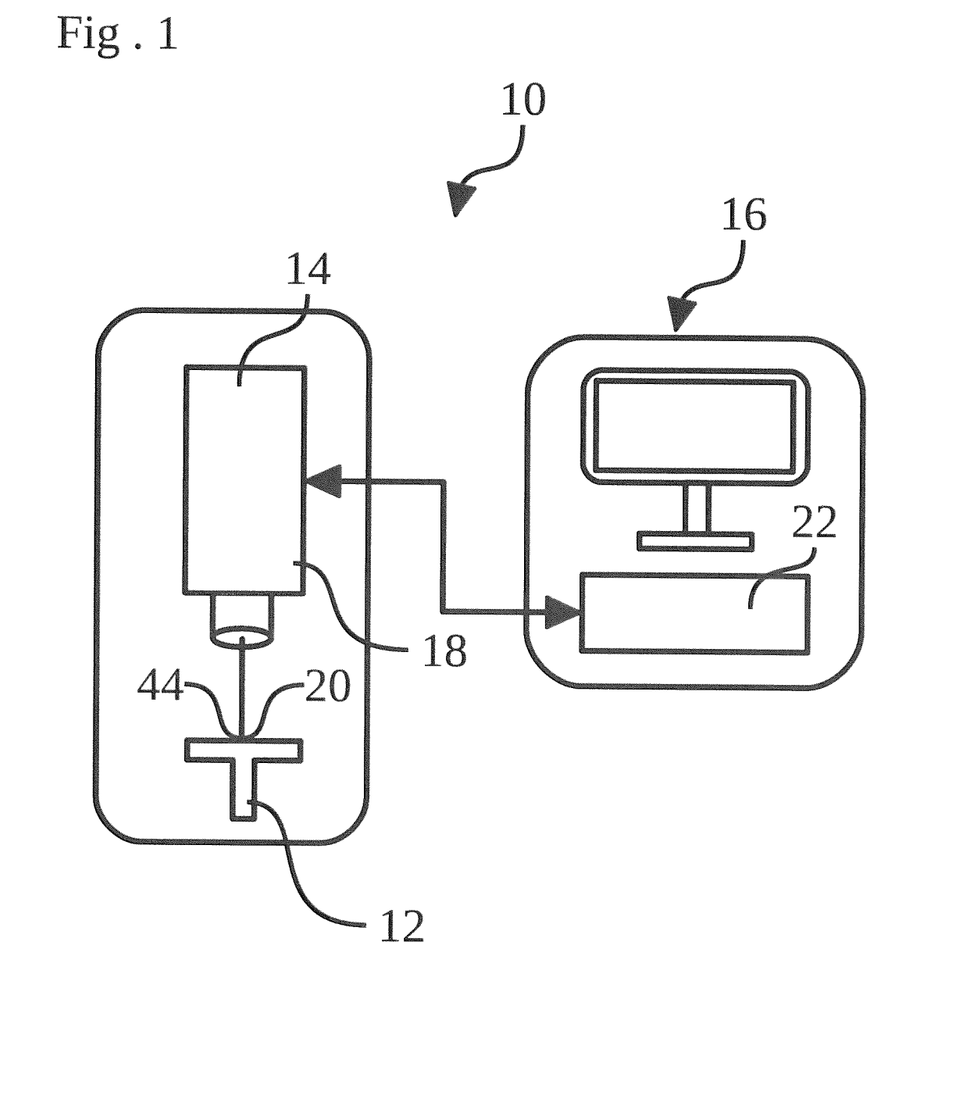
FIG. 1 depicts an example of a system for measuring striation properties.

FIG. 1 depicts a system 10 for measuring the presence of fatigue damage in a part 12.

The system 10 comprises an imaging device 14 and an evaluation device 16.

The imaging device 14 preferably comprises a scanning microscope device 18, such as a scanning electron microscope (SEM).

The part 12 is positioned such that the imaging device 14 may take images of a sample surface 20 of the part 12.

The evaluation device 16 preferably comprises a data processing device 22, such as a computer. It should be noted that the data processing device 22 may be a single device or combined from multiple devices performing the steps of the measurement method subsequently described.

Figure 2:
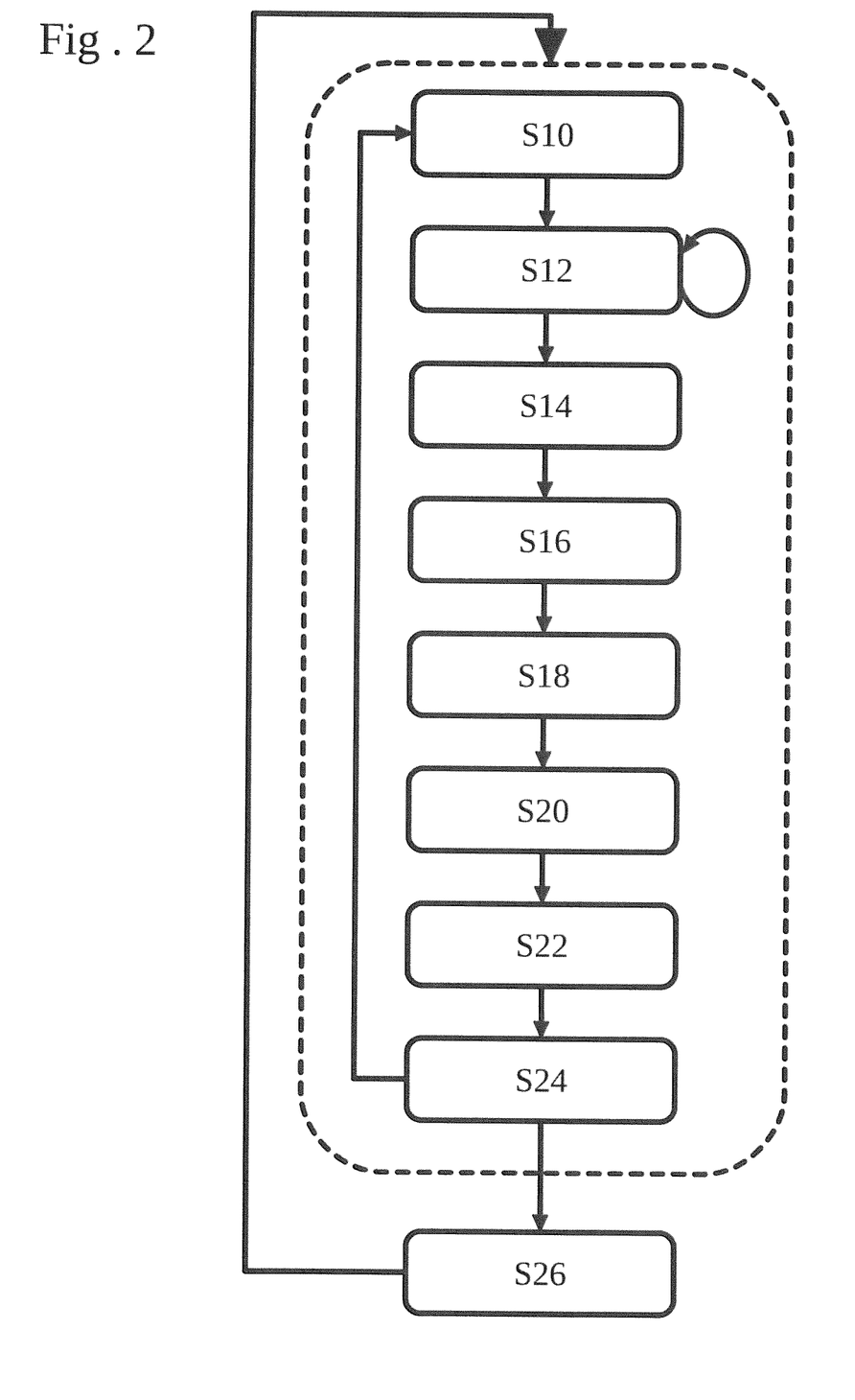
FIG. 2 depicts an embodiment of a method for determining the presence of fatigue damage.

FIG. 2 depicts an example of a method for determining the presence of fatigue damage in the part 12.

As depicted in FIG. 2 initially an imaging step S10 is performed with the imaging device 14, e.g. the scanning microscope device 18. During the imaging step S10 the sample surface 20 is scanned so as to obtain a sample image 24. An example for a sample image 24 that arises from performing the imaging step S10 is depicted in FIG. 3.

Figure 3:
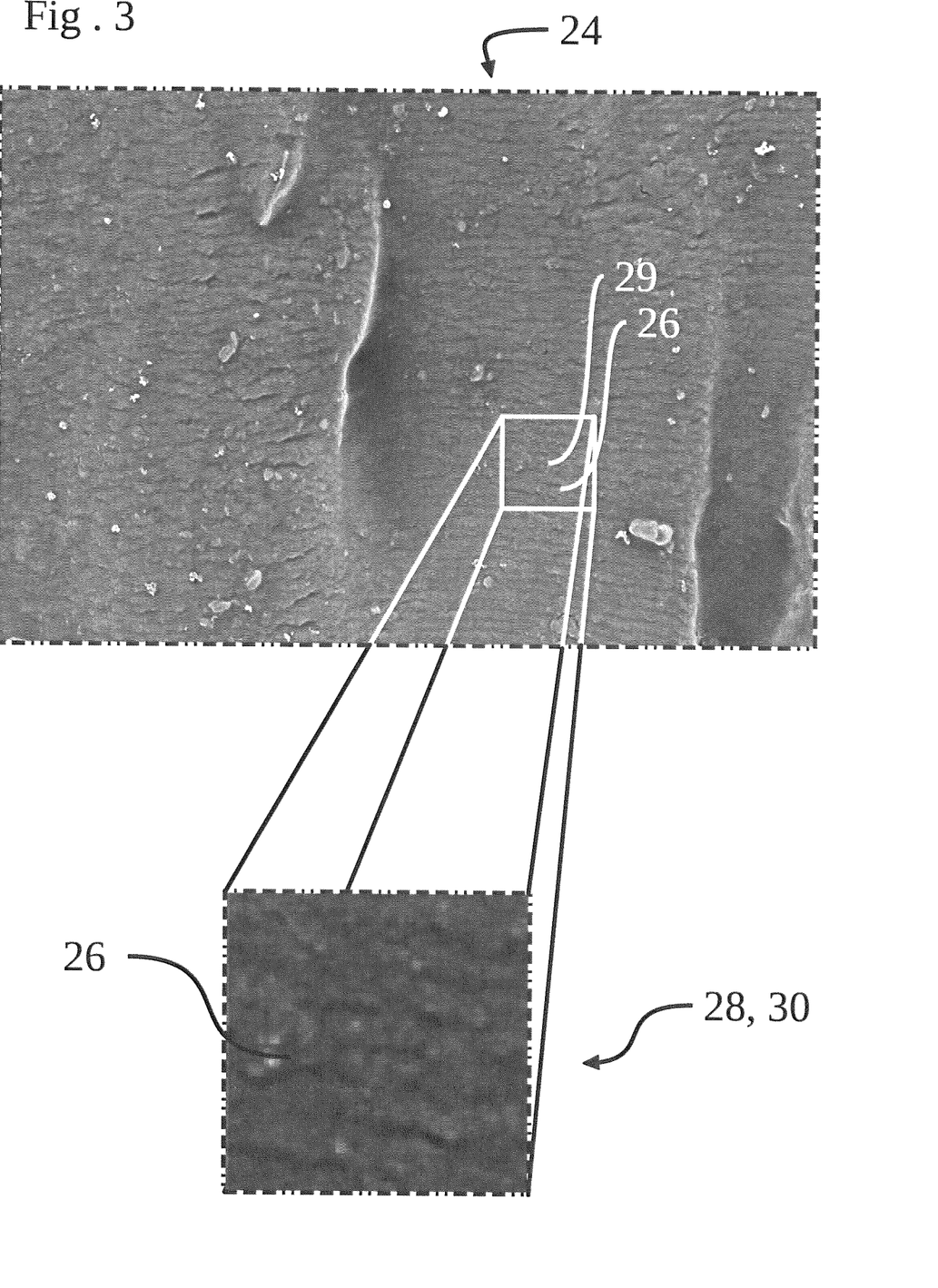
FIG. 3 depicts an example of a sample image and a sample image patch.

As can be seen in FIG. 3 the sample image 24 contains a plurality of fatigue striations 26.

In the usual manner, the sample image 24 is obtained from the scanning microscope device 18 as a grey scale image. During the subsequent processing, the sample image 24 can be thought of as a matrix of number values arranged in rows and columns. In this matrix one cell typically represents a single pixel of the sample image 24. Consequently, if a row or column of pixels is referenced, one can also think of a row or column of numbers that represent the respective pixels.

The sample image 24 is passed on to an image patch selecting step S12. In this step, using an image patch selecting device, a sample image patch 28, e.g. a portion of the sample image 24 is selected for further processing. The image patch selection step S12 may be repeated several times on the same sample image 24 selecting different portions as further sample image patches 30. The sample image patch 28, as exemplified in FIG. 3, and the further sample image patches 30 are selected in such a way that they are centered on the same pixel 29 of the sample image 24.

Figure 4:
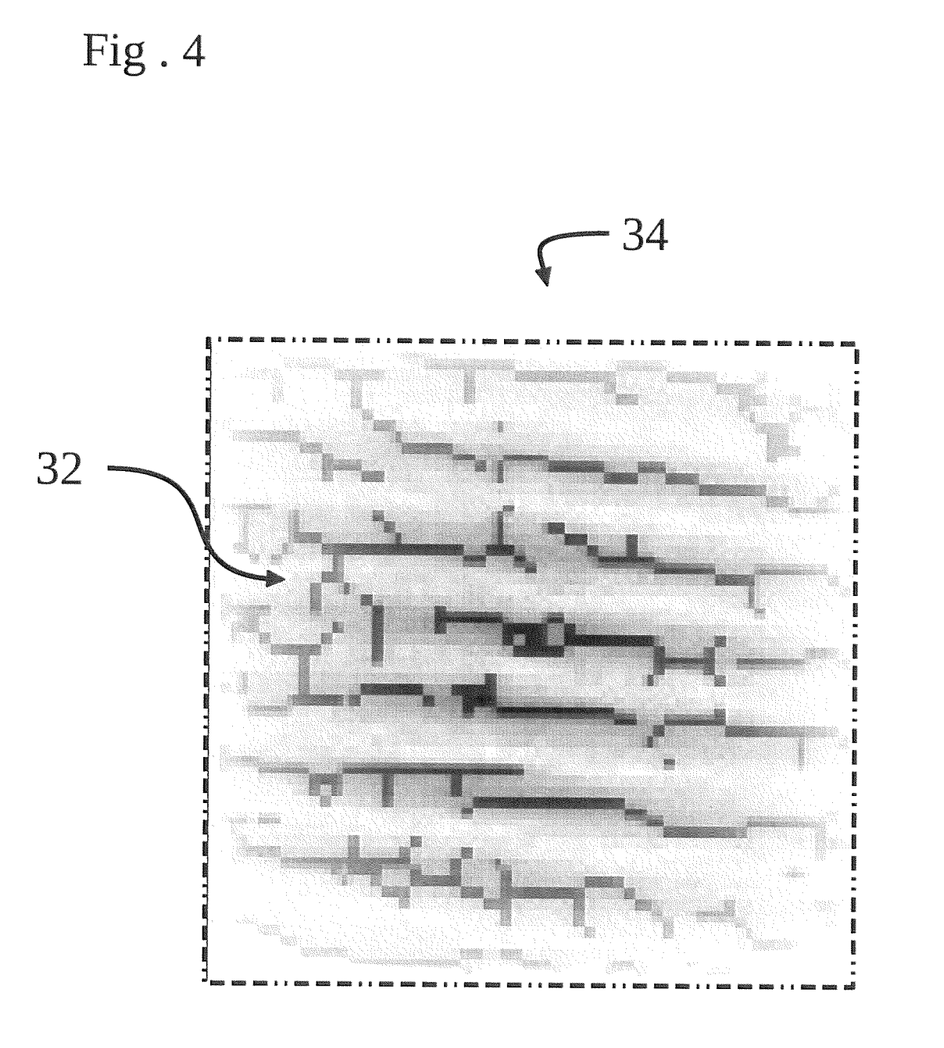
FIG. 4 depicts an example of a normalized image patch; depicts an example of an autocorrelation image patch.

The sample image patches 28, 30 are passed on to a pre-processing step S14. In the pre-processing step S14, the sample image patch 28 is normalized and line-like regular structures 32 are enhanced. The result of the pre-processing step S14 is a normalized image patch 34 that is depicted in FIG. 4. Subsequently, the patches are depicted as a negative for easier illustration in grey scale.

The pre-processing step S14 is performed on the basis of image processing techniques that are known in the art per se. In a simple example, Gaussian filters can be applied to the sample image patch 28 in order to reduce noise and subsequently the intensity values of the sample image patch 28 are normalized to a fixed range from 0 to 1.

As illustrated in FIG. 4, the regular structure 32 exhibits a pattern of equidistant lines repeating with a certain dominating frequency. The window function is also visible and causes a fading of the regular structure 32 with greater radial distance from the center towards the rim of the normalized image patch 34.

Figure 5:
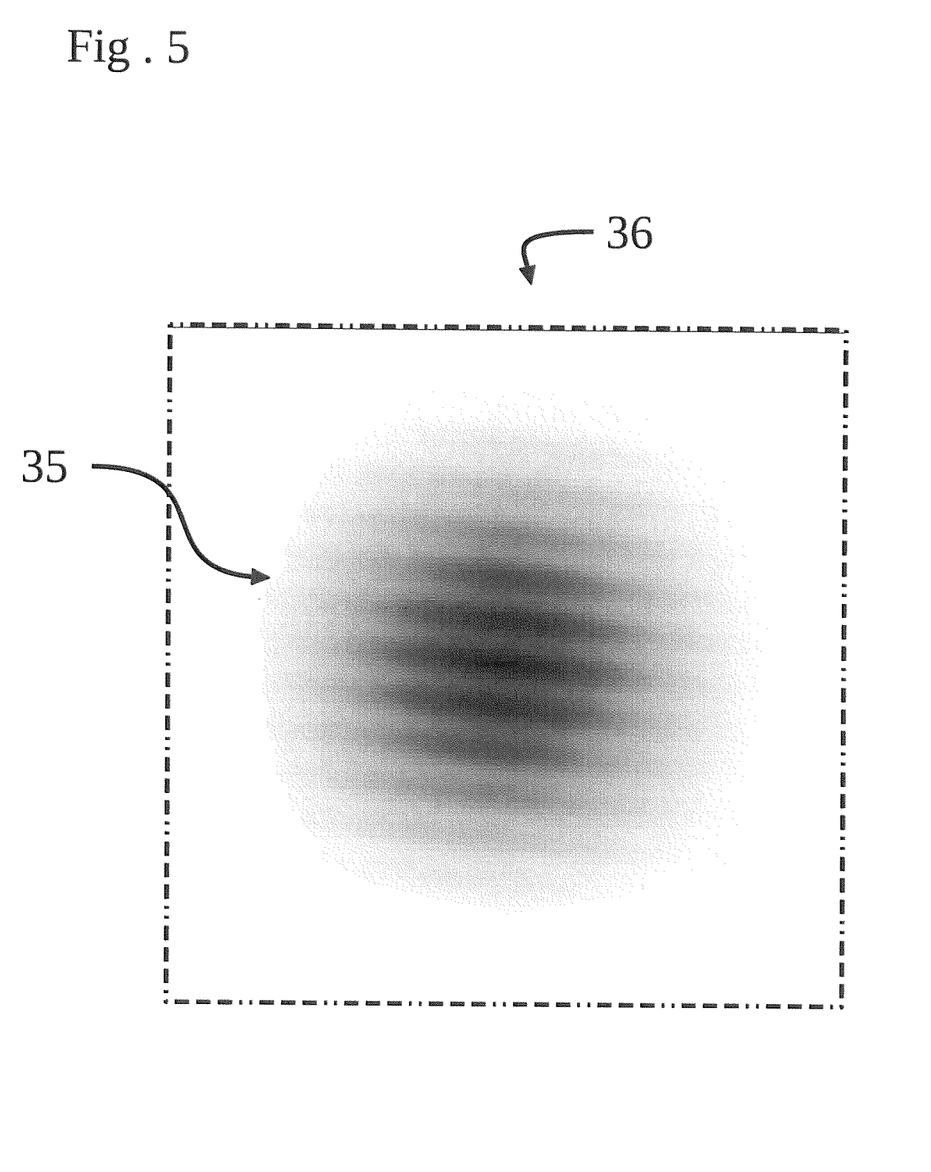

The normalized image patch 34 is passed on to an autocorrelation step S16. In the autocorrelation step S16, an autocorrelation of the normalized image patch 34 is calculated. In other words, the correlation between the normalized image patch and itself is calculated. The result of the autocorrelation step S16 is an autocorrelation image patch 36 as depicted in FIG. 5. Due to the autocorrelation the periodicity of features is further enhanced and is indicated by the stripe-like features 35.

Figure 6:
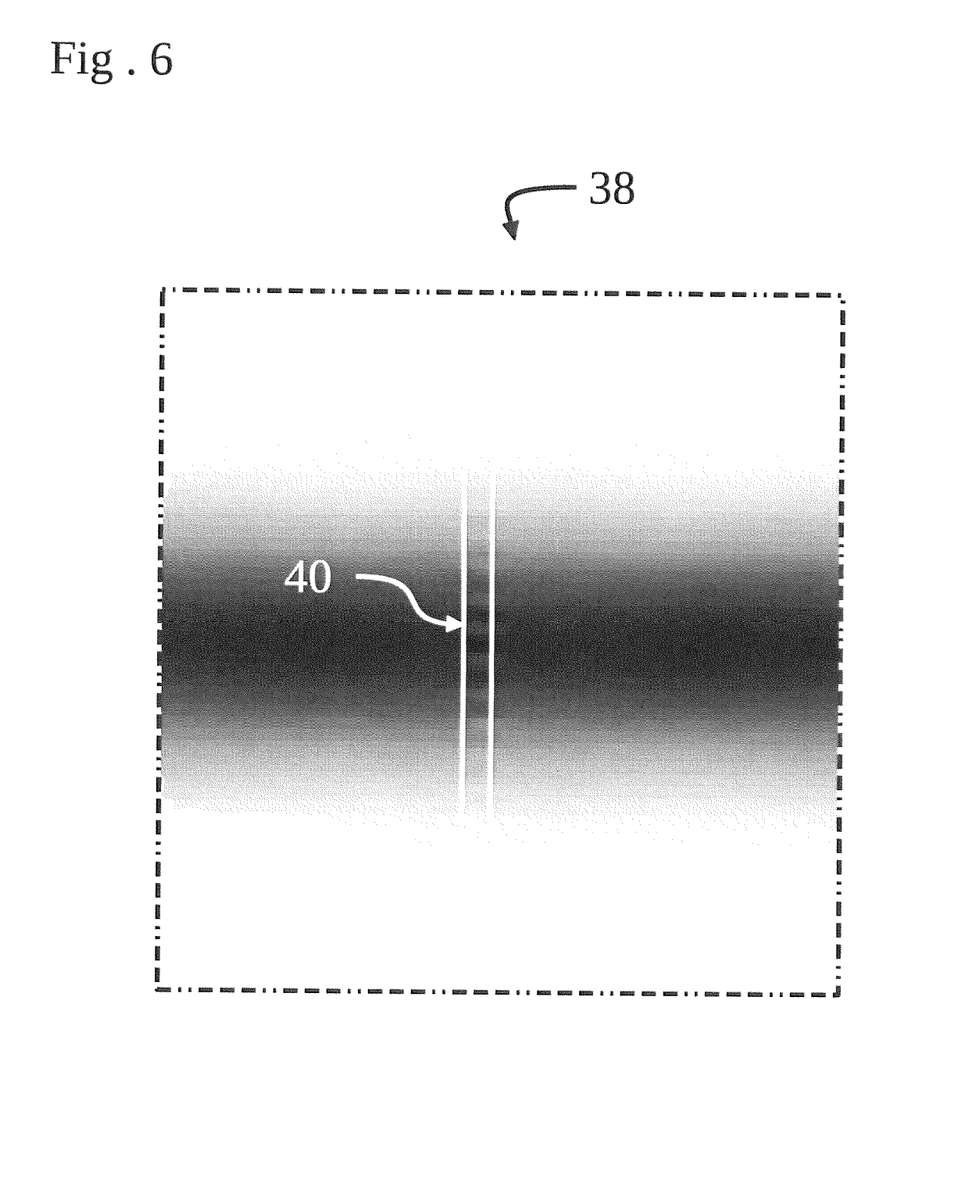
FIG. 6 depicts an example of a transformed image patch.

The autocorrelated image patch 36 is passed on to a Radon transform step S18. In the Radon transform step S18, a Radon transform of the autocorrelation image patch 36 is performed which results in a transform image patch 38. The Radon transform may be performed such that the horizontal axis corresponds to the Radon projection angle and the vertical axis corresponds to the radial components of the Radon projection. As depicted in FIG. 6, in the present example repetitive structures 40 are present and form a vertical line close to the center of the transformed image patch 38. The pair of vertical lines was added artificially for assisting in identifying the repetitive structures 40 and is not caused by any step of the method.

The transformed image patch 38 is passed on to a frequency analysis step S20. Therein a spectral analysis of the transformed image patch 38 is performed in order to obtain a power spectrum 42. For example, a Fourier transformation of the transformed image patch 38, preferably a fast Fourier transformation or FFT, is performed on each column of the transformed image patch 38.

Figure 7:
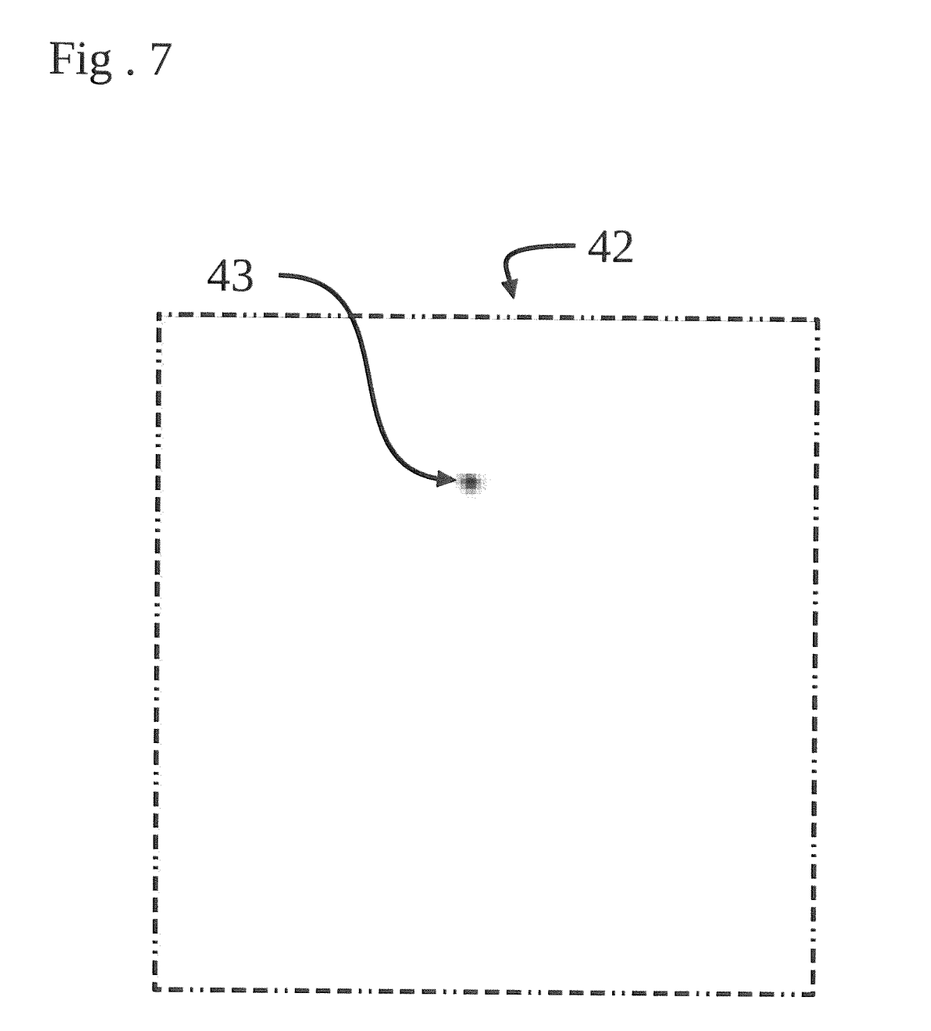
FIG. 7 depicts an example of a power spectrum.

Thus, the power spectrum 42 as depicted in FIG. 7 is obtained. The power spectrum 42 has again on its horizontal axis the Radon projection angle. However, the vertical axis was transformed from the spatial domain to the spatial frequency domain thereby resulting in a single peak 43 in this case, since there is only one periodicity present in the current sample surface 20.

The power spectrum 42 is passed on to a striation property determining step S22. In this step, the striation properties of the fatigue striations 26 are obtained from the power spectrum 42. As described before, the position of the peak 43 of the power spectrum 42 includes the relevant striation properties. The horizontal position of the peak 43 from the origin corresponds to the angle in which the fatigue striations 26 are aligned.

Furthermore, the position of the peak 43 of the power spectrum 42 along the vertical axis corresponds to the spatial frequency or "striations per unit length" and is called the striation density. Furthermore, in the striation property determining step S22, the results of the further sample image patches 30 may be processed in order to obtain an estimation for the errors of the striation properties determined from the sample image patch 28.

Optionally a closing step S24 may be performed which can choose to repeat the method along a crack 44 in the part 12 along the crack path.

It should be noted that the steps S10 to S22 and optionally S24 form a method for measuring striations properties.

The method for determining the presence of fatigue damage further comprises a fatigue damage determining step S26. In this step the results of the measuring method S10 to S24 are processed. Basically, in the fatigue damage determining step S26, it is determined that the part 12 suffers from fatigue damage, if a predetermined threshold is exceeded by a peak in the power spectrum. If the peak does not exceed the predetermined threshold then the part 12 is determined to not suffer from fatigue damage. Furthermore, in step S26, measurement outliers or measurement results that are not consistent with the known physics of crack propagation are discarded. Furthermore, if "gaps" should be left due to discarding measurement data, the step S26 can cause a repeat of the measuring method in order to fill those "gaps".

In order to improve the measurement or assessment of fatigue damage to parts a computer-implemented method for measuring striation properties of fatigue striations (26) on a sample surface of a part (12) is proposed. A sample surface (20) is imaged using a scanning electron microscope so as to obtain a sample image (24) potentially containing the fatigue striations (26). A sample image patch (28) potentially containing the fatigue striations (26) is selected from the sample image (24) for further processing. After normalizing the sample image patch (28) and enhancing line-like regular structures contained in the sample image patch (28) the resulting normalized image patch (34) is autocorrelated, Radon transformed and spectrally analyzed. The resulting power spectrum (42) of the transformed image patch (38) contains information about the striation properties of the fatigue striations (26) contained in the sample image (24), if any fatigue striations (26) are present. Furthermore, a system for performing the method is disclosed herein.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 system
12 part
14 imaging device
16 evaluation device
18 scanning microscope device
20 sample surface
22 data processing device
24 sample image
26 fatigue striations
28 sample image patch
29 pixel
30 further sample image patch
32 regular structure
34 normalized image patch
35 stripe-like feature
36 autocorrelation image patch
38 transformed image patch
40 repetitive structure
42 power spectrum
43 peak
44 crack
S10 imaging step
S12 image patch selecting step
S14 pre-processing step
S16 autocorrelation step
S18 Radon transform step
S20 frequency analysis step
S22 striation property determining step
S24 closing step
S26 fatigue damage determining step

The invention claimed is:

1. A computer-implemented method for determining whether a part suffers from fatigue damage, the method comprising:
   1.1 with a scanning microscope device, imaging the sample surface so as to obtain a sample image potentially containing the fatigue striations;
   1.2 with an image patch selecting device, selecting a sample image patch potentially containing the fatigue striations from the sample image for further processing;
   1.3 with a pre-processing device:
      normalizing the sample image patch by performing, on the sample image patch, any of:
         a Gaussian filter operation; and/or
         a histogram equalization; and/or
         an image binarization and subsequent morphological operation, such as including erosion, dilation or skeleton-operations; and/or
         a frequency domain self-filtering operation; and/or
         a window operation or applying a Hamm window; and/or
         a normalization operation to normalize intensity values to a fixed range; and
      enhancing line-like regular structures contained in the sample image patch to obtain a normalized image patch;
   1.4 with an autocorrelation device, determining an autocorrelation of the normalized image patch to obtain an autocorrelation image patch;
   1.5 with a Radon transform device, performing a Radon transform of the autocorrelation image patch to obtain a transformed image patch;
   1.6 with a frequency analysis device, performing a spectral analysis of the transformed image patch and determining a power spectrum of the transformed image patch;
   1.7 with a striation property determining device, determining, from the power spectrum, at least one striation property that is suitable to indicate a presence of fatigue striations in the sample image patch; and
   1.8 with a fatigue damage determining device, determining, if a peak in the power spectrum exceeds a predetermined threshold, that the part suffers from fatigue damage, and determining, if the peak does not exceed the predetermined threshold, that the part does not suffer from fatigue damage.

2. A system configured for carrying out a method for determining striation properties of fatigue striations on a sample surface of a part, the system comprising a scanning microscope device configured for imaging the sample surface to obtain a sample image potentially containing the fatigue striations and a data processing apparatus having:
   an image patch selecting device configured for selecting a sample image patch potentially containing the fatigue striations from the sample image;
   a pre-processing device configured for:
      normalizing the sample image patch by performing, on the sample image patch, any of:
         a Gaussian filter operation; and/or
         a histogram equalization; and/or
         an image binarization and subsequent morphological operation, such as including erosion, dilation or skeleton-operations; and/or
         a frequency domain self-filtering operation; and/or
         a window operation or applying a Hamm window; and/or
         a normalization operation to normalize intensity values to a fixed range; and
      enhancing line-like regular structures contained in the sample image patch to obtain a normalized image patch;
   an autocorrelation device configured for determining an autocorrelation of the normalized image patch to obtain an autocorrelation image patch;
   a Radon transform device configured for performing a Radon transform of the autocorrelation image patch to obtain a transformed image patch;
   a frequency analysis device configured for performing a spectral analysis of the transformed image patch and determining a power spectrum of the transformed image patch;
   a striation property determining device configured for determining, from the power spectrum, at least one striation property that is suitable to indicate a presence of fatigue striations in the sample image patch; and
   a fatigue damage determining device configured for determining, if a peak in the power spectrum exceeds a predetermined threshold, that the part suffers from fatigue damage, and determining, if the peak does not exceed the predetermined threshold, that the part does not suffer from fatigue damage.

3. A non-transitory computer-readable data carrier having stored thereon a computer program product comprising instructions which, when the program is executed by a computer, are configured to cause the computer to carry out a method for determining whether a part suffers from fatigue damage, the method comprising:
- 1.1 with a scanning microscope device, imaging the sample surface so as to obtain a sample image potentially containing the fatigue striations;
- 1.2 with an image patch selecting device, selecting a sample image patch potentially containing the fatigue striations from the sample image for further processing;
- 1.3 with a pre-processing device:
  normalizing the sample image patch by performing, on the sample image patch, any of: a Gaussian filter operation; and/or a histogram equalization; and/or an image binarization and subsequent morphological operation, such as including erosion, dilation or skeleton-operations; and/or a frequency domain self-filtering operation; and/or a window operation or applying a Hamm window; and/or a normalization operation to normalize intensity values to a fixed range; and enhancing line-like regular structures contained in the sample image patch to obtain a normalized image patch;
- 1.4 with an autocorrelation device, determining an autocorrelation of the normalized image patch to obtain an autocorrelation image patch;
- 1.5 with a Radon transform device, performing a Radon transform of the autocorrelation image patch to obtain a transformed image patch;
- 1.6 with a frequency analysis device, performing a spectral analysis of the transformed image patch and determining a power spectrum of the transformed image patch;
- 1.7 with a striation property determining device, determining, from the power spectrum, at least one striation property that is suitable to indicate a presence of fatigue striations in the sample image patch; and
- 1.8 with a fatigue damage determining device, determining, if a peak in the power spectrum exceeds a predetermined threshold, that the part suffers from fatigue damage, and determining, if the peak does not exceed the predetermined threshold, that the part does not suffer from fatigue damage.

4. A computer comprising the non-transitory computer-readable data carrier of claim 3.

5. The computer-implemented method according to claim 1, wherein, in step 1.1, the scanning microscope device is a scanning electron microscope or a scanning probe microscope.

6. The computer-implemented method according to claim 1, wherein, in step 1.2, a plurality of different sized sample image patches is selected, and the sample image patches are centered around a same point of the sample image, and steps 1.3 to 1.8 are performed on each of the sample image patches.

7. The computer-implemented method according to claim 1, wherein, in step 1.3, normalizing the sample image page is done by performing, on the sample image patch, the normalization operation, the fixed range to which the intensity values are normalized being 0 to 1.

8. The computer-implemented method according to claim 1, wherein, in step 1.4, the autocorrelation is determined via a frequency domain and using a zero-padded input image patch.

9. The computer-implemented method according to claim 1, wherein, in step 1.6, the spectral analysis is performed by a one-dimensional spectral analysis along each radial coordinate that corresponds to columns of the transformed image patch.

10. The computer-implemented method according to claim 1, wherein, in step 1.7, the striation angle and/or striation distance and/or striation density is determined from a strongest frequency component of the power spectrum.

11. The computer-implemented method according to claim 1, further comprising repeating the steps 1.1 through 1.8 along a fracture surface and/or along a crack propagation path.

12. The computer-implemented method according to claim 11, wherein the striation properties are integrated along the fracture surface and/or crack propagation path and determining integrated striation properties and/or errors of the integrated striation properties.

* * * * *